United States Patent Office 3,324,162
Patented June 6, 1967

3,324,162
PHENACYL CARBAMATE COMPOUNDS
Richard A. Nyquist and Richard D. McLachlan, Midland, Mich., assignors to The Dow Chemical Company, Midland, Mich., a corporation of Delaware
No Drawing. Filed Nov. 20, 1963, Ser. No. 325,161
4 Claims. (Cl. 260—455)

The present invention is directed to the novel phenacyl carbamate compounds of the formula

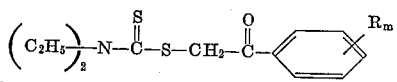

wherein R represents halogen and $m$ is an integer of from 1 to 2, inclusive. The compounds are crystalline solids soluble in many common organic solvents such as acetone and benzene and of low solubility in water. In the present specification and claims, the term halogen is used to refer to bromine, chlorine, and fluorine only.

The present compounds can be prepared by reacting together an acetophenone compound of the formula

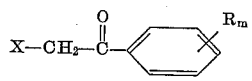

and an alkali metal diethyldithiocarbamate of the formula

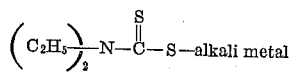

In the above formulae, the symbol X represents bromo, chloro, or iodo, and the term "alkali metal" is illustrated by sodium or potassium. Conveniently, the reaction is carried out in an inert organic liquid reaction medium which can be a halogenated hydrocarbon, an aromatic liquid, or a lower alkanol; such as, for example, chloroform, benzene, or methanol. The acetophenone compound and the alkali metal diethyldithiocarbamate react together in equimolecular proportions; and good results are obtained when the said reactants are supplied in amounts which represent such proportions. The reaction takes place smoothly at temperatures of from approximately 20° to approximately 100° C., with production of a product of the present invention together with byproduct which is of the formula Alkali metal—X In carrying out the reaction, the reactants are mixed and contacted together in any convenient fashion and the resulting mixture maintained for a period of time in the reaction temperature range to complete the reaction. Upon completion of the reaction, the desired product can be separated in various manners. In one such operation, the reaction mixture is filtered, and the solvent removed from the filtrate by evaporation to obtain the desired product as a residue. The product can be purified as, for example, by recrystallization from hexane.

Those compounds of the present invention wherein $m$ represents 1 are prepared from less expensive starting materials and constitute a preferred embodiment. A more preferred embodiment of the present invention consists of those compounds of the formula

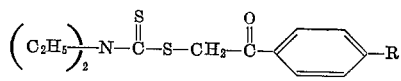

These compounds possess the present utilities in a high degree.

The following examples illustrate the best known manner of practicing the present invention but are not to be considered as limiting it.

Example 1.—Para-chlorophenacyl diethyldithiocarbamate 2-bromo-4'-chloroacetophenone (10.0 grams; 0.04 mole) and 200 milliliters of chloroform are mixed together; to the resulting mixture is added slowly portionwise and with stirring 8.5 grams (0.05 mole) of the sodium salt of diethyldithiocarbamic acid. The addition is carried out at room temperature over a period of four hours and with continuous stirring. The mixture is then filtered and the solvent removed from the filtrate by evaporation, to obtain the para-chlorophenacyl diethyldithiocarbamate product as a residue. This product is recrystallized from hexane and is found to be a crystalline material freezing at about 69° C.

Example 2.—3,4-dichlorophenacyl diethyldithiocarbamate 2,3',4'-trichloroacetophenone (25 grams; 0.11 mole) was mixed with about 200 milliliters of carbon tetrachloride, and to the resulting mixture there was added 25 grams of sodium diethyldithiocarbamate trihydrate (0.11 mole). The reaction mixture thus prepared was heated at a temperature of 100° C. for about 2 hours. The heated reaction mixture was cooled and filtered, and the carbon tetrachloride removed from the filtrate by evaporation under subatmospheric pressure to obtain the 3,4-dichlorophenacyl diethyldithiocarbamate product as a liquid residue. The product residue was thereafter purified by dispersing it in hot heptane and cooling and filtering the resulting dispersion to obtain a purified product residue. The purified product residue was dispersed in carbon disulfide, the dispersion washed with water, dried, cooled, and filtered to separate the product as a crystalline material melting at 86.1–87.4° C.

In a similar manner, other products representative of the present invention are prepared as follows:

From 2,4'-dibromoacetophenone and potassium diethyldithiocarbamate, a crystalline para-bromophenacyl diethyldithiocarbamate product freezing at 58.3° C.

From 2,2'-dichloro-6'-fluoroacetophenone and sodium diethyldithiocarbamate, a 2-chloro-6-fluorophenacyl diethyldithiocarbamate product having a molecular weight of 319.9.

From 2-chloro-3',5'-dibromoacetophenone and sodium diethyldithiocarbamate, 3,5-dibromophenacyl diethyldithiocarbamate product having a molecular weight of 425.2.

From 2-bromo-2',4,-dichloroacetophenone and potassium diethyldithiocarbamate, a crystalline 2,4-dichlorophenacyl diethyldithiocarbamate product melting at 108–110° C.

From 2,3'-dibromoacetophenone and sodium diethyldithiocarbamate, a meta-bromophenacyl diethyldithiocarbamate product having a molecular weight of 346.3.

From 2,2',5'-trichloroacetophenone and sodium diethyldithiocarbamate, crystalline 2,5-dichlorophenacyl diethyldithiocarbamate product melting at 78–80° C.

From 2-bromo-2'-chloroacetophenone and potassium diethyldithiocarbamate, ortho-chlorophenacyl diethyldithiocarbamate product having a molecular weight of 301.9.

From 2-bromo-4'-fluoroacetophenone and sodium diethyldithiocarbamate, para-fluorophenacyl diethyldithiocarbamate product having a molecular weight of 285.4. In a representative preparation, the product was a yellow solid material.

From 2,5'-dibromo-2'-chloroacetophenone and sodium diethyldithiocarbamate, 2-chloro-5-bromophenacyl diethyldithiocarbamate product having a molecular weight of 380.8.

The products of the present invention have been found to be useful as herbicides and parasiticides for the control of a number of plant, helminth, mite, insect, bacterial, and fungal organisms. Various useful properties of these products become available when product is dispersed on a finely divided adjuvant solid to obtain a toxicant dust. Also, such dust can be dispersed in water with the aid of a wetting agent and the further resulting aqueous suspension employed as a spray. In other procedures a product can be employed as a constituent of organic liquid, oil-in-water or water-in-oil emulsions, or water dispersions with or without the addition of wetting, dispersing, or emulsifying agents.

In a representative operation, young bean plants were thoroughly wetted with an aqueous composition containing 500 parts of para-chlorophenacyl diethyldithiocarbamate as sole toxicant per million parts ultimate composition, all by weight. The plants were allowed to stand until dry. Known numbers of healthy, young larvae of southern army worm (*Prodenia eridania*) were then placed upon the said plants and permitted to feed thereupon. Three to six days after the larvae began to feed upon the treated plants, the plants and insects were examined and all the larvae were found to be dead.

Certain of the acetophenone compounds employed as starting materials to make the products of the present invention are articles of commerce. Those which are not are prepared in known procedures. For example, a benzene compound of the formula 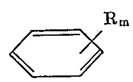 is reacted with acetyl chloride to prepare an acetyl benzene compound of the formula 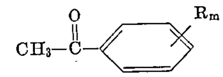 which compound is thereafter reacted with a compound of the formula $X_2$ in the presence of ferric chloride, and in carbon disulfide as reaction medium, to prepare the desired acetophenone starting material.

We claim:

1. Compound of the formula 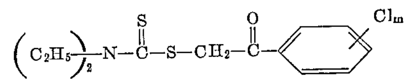 wherein *m* is an integer of from 1 to 2, both inclusive.

2. Para-chlorophenacyl diethyldithiocarbamate.
3. 3,4-dichlorophenacyl diethyldithiocarbamate.
4. 2,5-dichlorophenacyl diethyldithiocarbamate.

References Cited

Hirano: "Chemical Abstracts," vol. 50, p. 1830–1, (1956).

CHARLES B. PARKER, *Primary Examiner.*

JOSEPH P. BRUST, *Examiner.*

DELBERT R. PHILLIPS, *Assistant Examiner.*